US012789667B2

(12) United States Patent
Wang et al.

(10) Patent No.: US 12,789,667 B2
(45) Date of Patent: Nov. 10, 2026

(54) ELECTRIC CHASSIS STRUCTURE WITH SWAPPABLE BATTERIES

(71) Applicant: A&C FUTURE, INC., Newport Beach, CA (US)

(72) Inventors: Pengcheng Wang, Irvine, CA (US); Yenchang Lin, Irvine, CA (US); Ju Gao, Newport Beach, CA (US); Phil R. Schmidt, Huntington Beach, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 518 days.

(21) Appl. No.: 18/495,595

(22) Filed: Oct. 26, 2023

(65) Prior Publication Data

US 2025/0141012 A1 May 1, 2025

(51) Int. Cl.

| | |
|---|---|
| ***B60L 53/80*** | (2019.01) |
| ***B60L 50/60*** | (2019.01) |
| ***B60L 50/64*** | (2019.01) |
| ***H01M 50/209*** | (2021.01) |
| ***H01M 50/244*** | (2021.01) |
| ***H01M 50/249*** | (2021.01) |
| *B60K 1/04* | (2019.01) |

(52) U.S. Cl.

CPC ............... *B60L 53/80* (2019.02); *B60L 50/64* (2019.02); *B60L 50/66* (2019.02); *H01M 50/209* (2021.01); *H01M 50/244* (2021.01); *H01M 50/249* (2021.01); *B60K 2001/0438* (2013.01); *B60K 2001/0472* (2013.01); *H01M 2220/20* (2013.01)

(58) Field of Classification Search

CPC .............. B60K 1/04; B60K 2001/0438; B60K 2001/0472; B60L 53/80; B60L 50/64; B60L 50/66; H01M 50/209; H01M 50/244; H01M 50/249; H01M 50/204; H01M 2220/20

See application file for complete search history.

(56) References Cited

U.S. PATENT DOCUMENTS

| | | | |
|---|---|---|---|
| 7,913,788 B1 | 3/2011 | Bryer et al. | |
| 8,557,436 B2 | 10/2013 | Schwab | |

(Continued)

FOREIGN PATENT DOCUMENTS

| | | | |
|---|---|---|---|
| WO | WO-2023027960 A2 * | 3/2023 | ............... B60K 1/04 |

*Primary Examiner* — Timothy Hannon

(74) *Attorney, Agent, or Firm* — INNOVATION CAPITAL LAW GROUP, LLP; Vic Lin

(57) ABSTRACT

An advanced chassis structure design offers more battery storage spaces than same-class electric vehicles. The chassis structure provides four battery storage spaces. The significance of these additional storage areas lies in their direct impact on extending the driving range of the vehicle. The chassis structure design further addresses the issue of battery replacement in an electric vehicle chassis. Typically, when an electric vehicle runs out of battery, it takes several minutes or even hours for the battery to be fully recharged. When the battery is broken, the replacement process often involves significant disassembly, which is also time-consuming. With the chassis structure design, the battery is positioned underneath the chassis and fastened within the battery tray and protective battery case. This means that when it comes to battery replacement, the battery can be swapped just by removing a few screws.

19 Claims, 12 Drawing Sheets

(56) References Cited

U.S. PATENT DOCUMENTS

| | | | | |
|---|---|---|---|---|
| 9,236,592 | B2 | 1/2016 | Sundararajan et al. | |
| 9,637,093 | B2 | 5/2017 | Droste et al. | |
| 11,840,135 | B2 | 12/2023 | Bohmer et al. | |
| 2005/0274556 | A1 | 12/2005 | Chaney | |
| 2012/0125702 | A1 * | 5/2012 | Bergfjord | B60K 1/04 429/163 |
| 2016/0276638 | A1 | 9/2016 | Sham | |
| 2018/0108891 | A1 * | 4/2018 | Fees | B60L 50/66 |
| 2018/0154789 | A1 | 6/2018 | Janku | |
| 2018/0154940 | A1 | 6/2018 | Fritz et al. | |
| 2019/0217695 | A1 | 7/2019 | Hofer | |
| 2020/0198453 | A1 | 6/2020 | Hilfrich et al. | |
| 2021/0129651 | A1 | 5/2021 | Klomberg et al. | |
| 2021/0362579 | A1 * | 11/2021 | Kumagai | H01M 50/262 |
| 2022/0111717 | A1 * | 4/2022 | Hendriks | B60L 50/66 |
| 2023/0070279 | A1 | 3/2023 | Wheeler et al. | |
| 2023/0302889 | A1 | 9/2023 | Collignon et al. | |
| 2024/0166040 | A1 * | 5/2024 | Coupal-Sikes | H01M 50/204 |

* cited by examiner

ELECTRIC CHASSIS STRUCTURE WITH SWAPPABLE BATTERIES

BACKGROUND OF THE INVENTION

1. Field of the Invention

Embodiments of the invention relate generally to electric vehicles. More particularly, embodiments of the invention relate to a chassis structure that offers more battery storage spaces than same-class electric vehicles. The chassis structure design further provides an extended driving range and the ability to easily replace discharged, damaged or malfunctioning battery packs.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Electric vehicles have become more popular in recent years as many people look for alternatives in transportation, away from vehicles that require fossil fuels for operation. Government incentives further entice people in the move toward electric vehicles.

However, a current obstacle is the limited range of such electric vehicles when operating on a single charge. The worry about running out of charge provides a weight on consumers when deciding whether or not to purchase an electric vehicle. When an electric vehicle runs out of battery, it takes several minutes or even hours for the battery to be fully recharged. When the battery is broken, the replacement process often involves significant disassembly, which is also time-consuming.

In view of the foregoing, there is a need for an electric vehicle chassis structure design that can increase the space available for battery distribution, thus increasing the overall power available to the vehicle and, accordingly, increasing the range of the electric vehicle. The chassis structure design should also provide for easy replacement of batteries as needed.

SUMMARY OF THE INVENTION

Embodiments of the present invention aim to solve the aforementioned problems in conventional chassis structure design by providing an advanced chassis structure design that offers more battery storage spaces than conventional same-class electric vehicles. The chassis provides four battery storage spaces. The significance of these additional storage areas lies in their direct impact on extending the driving range of the vehicle. Taking into consideration today's travel and remote working trends, this chassis could keep drivers from worrying about recharging their electric vehicles, even when traveling to places with no charging stations. Further, the battery is positioned underneath the chassis and fastened within the battery tray and protective battery case. This means that when it comes to battery replacement, we can swap the battery just by removing a few screws.

Embodiments of the present invention provide a chassis for an electric vehicle comprising a main chassis frame extending along a longitudinal axis of the electric vehicle; a plurality of lower battery compartments, each attached to the main chassis frame; and a removable lower cover of each of the plurality of lower battery compartments, the removable lower cover permitting removal of a battery from within respective ones of the plurality of lower battery compartments.

Embodiments of the present invention provide a chassis for an electric vehicle comprising a main chassis frame extending along a longitudinal axis of the electric vehicle; a plurality of lower battery compartments, each attached to the main chassis frame; a removable lower cover of each of the plurality of lower battery compartments, the removable lower cover permitting removal of a battery from within respective ones of the plurality of lower battery compartments; wherein the plurality of lower battery compartments each include a protective case attached below the main chassis, a tray removably covering an open bottom end of each protective case, and a support structure attached to a lower side of a tray base of the tray, the support structure operable to support the battery thereupon; and an angle bracket attached to an upper side of the protective case, the angle bracket providing an attachment to a side of an exterior surface of a rail of the main chassis.

Embodiments of the present invention provide a chassis for an electric vehicle comprising a main chassis frame extending along a longitudinal axis of the electric vehicle; a plurality of lower battery compartments, each attached to the main chassis frame; a removable lower cover of each of the plurality of lower battery compartments, the removable lower cover permitting removal of a battery from within respective ones of the plurality of lower battery compartments; wherein the plurality of lower battery compartments each include a protective case attached below the main chassis, a tray removably covering an open bottom end of each protective case, and a support structure attached to a lower side of a tray base of the tray, the support structure operable to support the battery thereupon; an angle bracket attached to an upper side of the protective case, the angle bracket providing an attachment to a side of an exterior surface of a rail of the main chassis; and a mounting bracket attached to the exterior surface of the rail of the main chassis, the mounting bracket having a mounting bracket attachment surface configured to be affixed to an angle bracket mounting surface of the angle bracket, wherein the angle bracket attachment surface is orthogonal with a top surface of the protective case.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
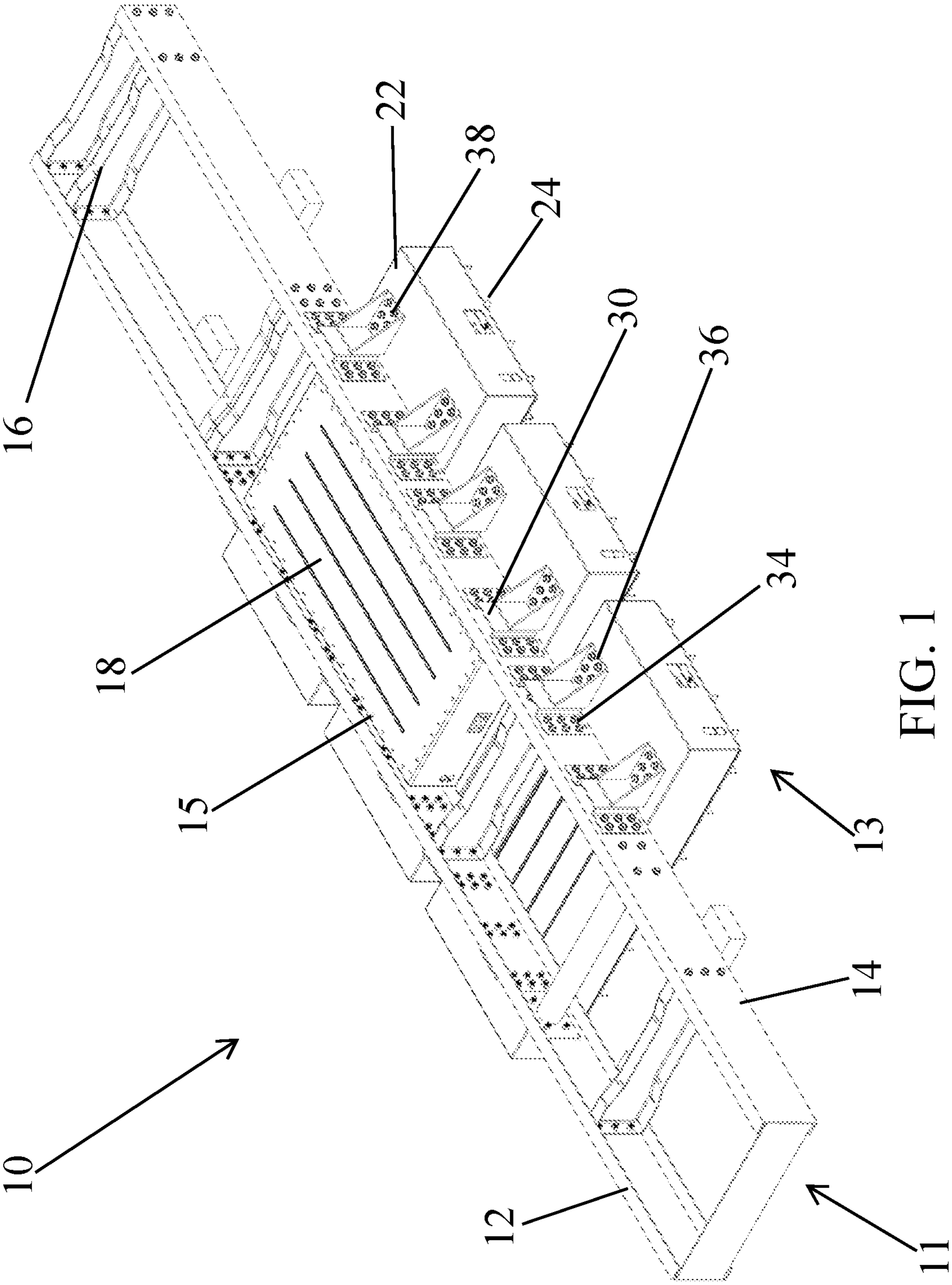
FIG. 1 illustrates a perspective view of an electric vehicle chassis structure and battery compartments, according to an exemplary embodiment of the present invention.
Figure 2:
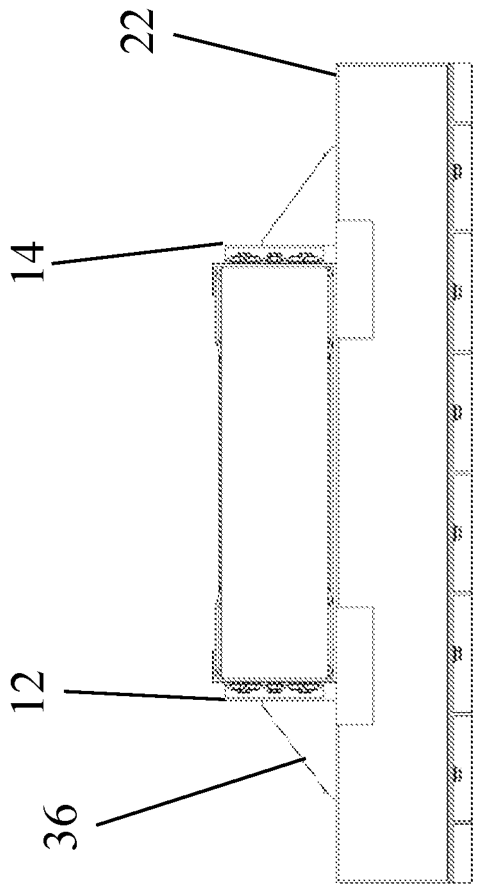
FIG. 2 illustrates a front view of the electric vehicle chassis structure and battery compartments of FIG. 1.
Figure 3:
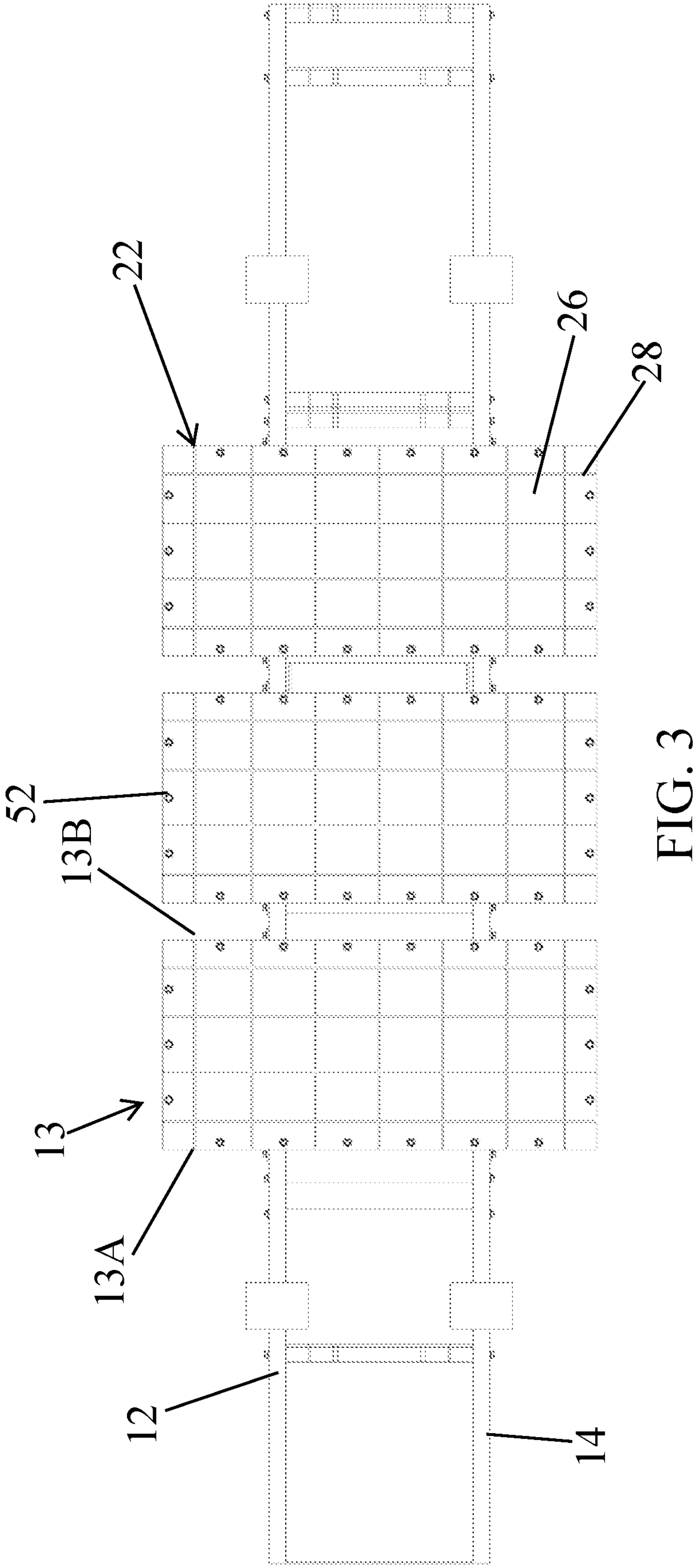
FIG. 3 illustrates a bottom view of the electric vehicle chassis structure and battery compartments of FIG. 1.
Figure 4:
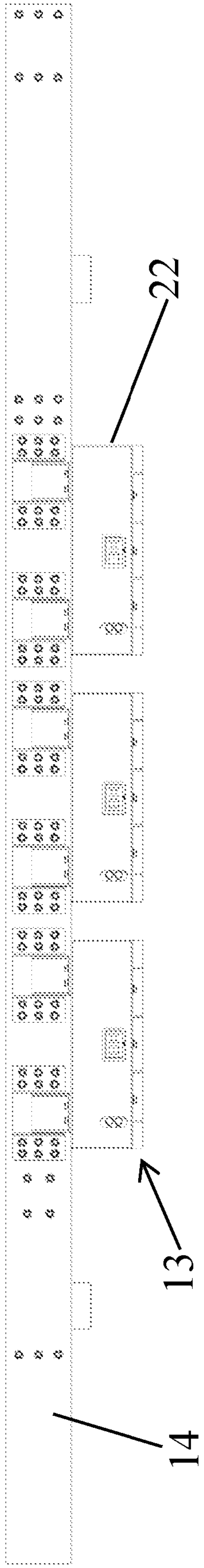
FIG. 4 illustrates a side view of the electric vehicle chassis structure and battery compartments of FIG. 1.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an advanced chassis structure design that offers more battery storage spaces than same-class electric vehicles. The chassis structure provides four battery storage spaces. The significance of these additional storage areas lies in their direct impact on extending the driving range of the vehicle. The chassis structure design further addresses the issue of battery replacement in an electric vehicle chassis. Typically, when an electric vehicle runs out of battery, it takes several minutes or even hours for the battery to be fully recharged. When the battery is broken, the replacement process often involves significant disassembly, which is also time-consuming. With the chassis structure design, the battery is positioned underneath the chassis and fastened within the battery tray and protective battery case. This means that when it comes to battery replacement, the battery can be swapped just by removing a few screws.

Referring to FIGS. 1 through 4, a vehicle chassis 10 may be designed for an electric vehicle, such as an all-electric vehicle, a plug-in hybrid electric vehicle, or the like. The chassis 10 can include a main chassis structure 11 formed by a first side main chassis rail 12 and a second side main chassis rail 14. Various cross members 16 can span between the first and second side main chassis rails 12, 14. The cross members 16 can include plate-type cross members, tube-type cross members and end caps.

A plurality of lower battery compartments 13 (three are shown in the Figures) may be attached to the main chassis structure 11. Typically, the lower battery compartments 13 are below an upper battery compartment 15 formed in the main chassis structure. Thus, an upper battery pack 18 can be disposed above a plurality of lower battery packs 20. The lower battery compartments 13 may be defined by first and second lower compartment rails 13A, 13B that are longitudinally perpendicular to the first and second main chassis rains 12, 14.

Figure 6:
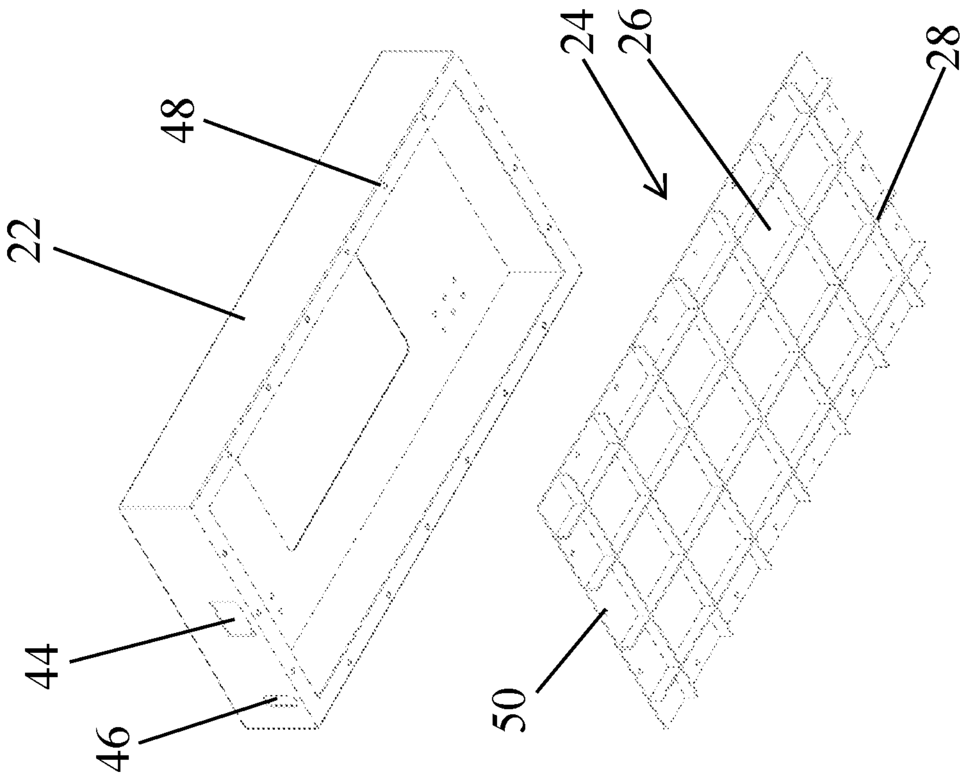
FIG. 6 illustrates a bottom perspective view of a protective battery case and tray used in the electric vehicle chassis structure of FIG. 1.
Figure 5:
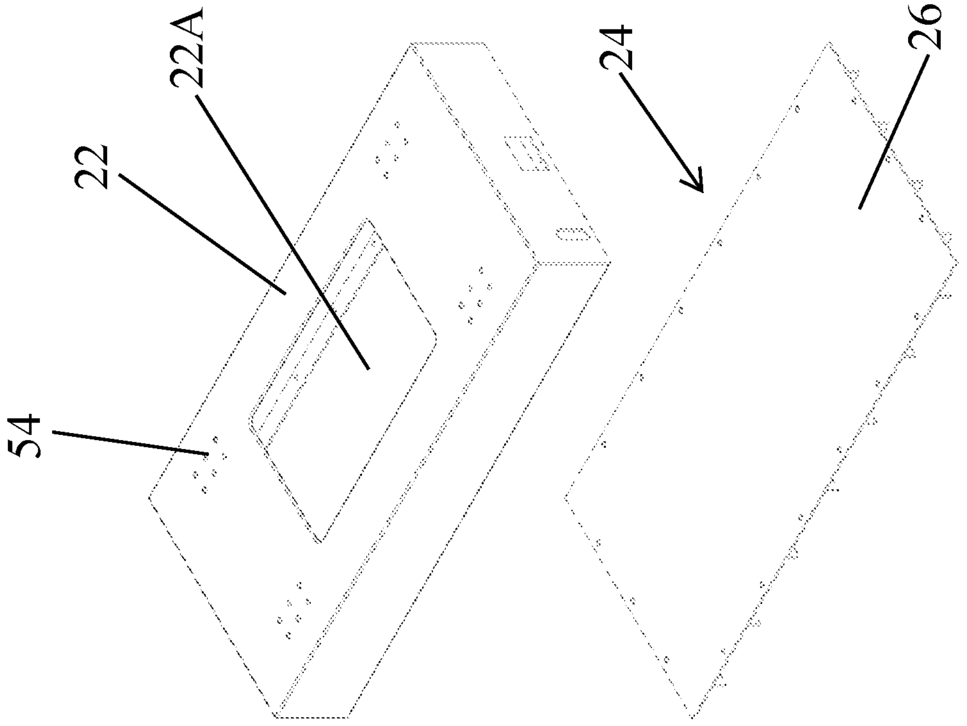
FIG. 5 illustrates a top perspective view of a protective battery case and tray used in the electric vehicle chassis structure of FIG. 1.

Referring also to FIGS. 5 and 6, the lower battery compartments 13 may be formed from a protective case 22 that can house the lower battery packs 20. A tray 24 can cover the open bottom of the protective case 22. As described below, when the tray 24 is removed, the battery pack 20 can be accessed and removed. The tray 24 can include a tray base 26, spanning an entire width and length of the tray 24. A tray support structure 28 can be disposed under the tray base 26 to provide additional support for the length and width spans of the tray base 26. The tray support structure 28 can be, for example, a metal framework attached to the tray base 26.

The protective case 22 can include a plurality of mounting holes 48 that can align with mounting holes 50 in the tray 24. Fasteners 52 can be used to secure the tray 24 with the protective case 22. Such fasteners 52, when removed, provides access to the open bottom of the protective case 22, permitting battery swap, as discussed and illustrated in FIGS. 10A through 10F.

The protective case 22 can include one or more side openings 44, 46. Such openings may permit a user to view a display on the lower battery pack 20, such as a status indicator, a charge indicator, or the like. Such openings may also provide an electrical connection to the electric vehicle. This can permit a user to disconnect the lower battery pack 20 before lowering the tray 24 to remove the battery. In other embodiments, the protective case 22 can include a top opening 22A that permits access to the lower battery pack 20 from a top side thereof. Such an opening 22A provides an alternate electrical connection location for the lower battery packs 20.

Figure 8:
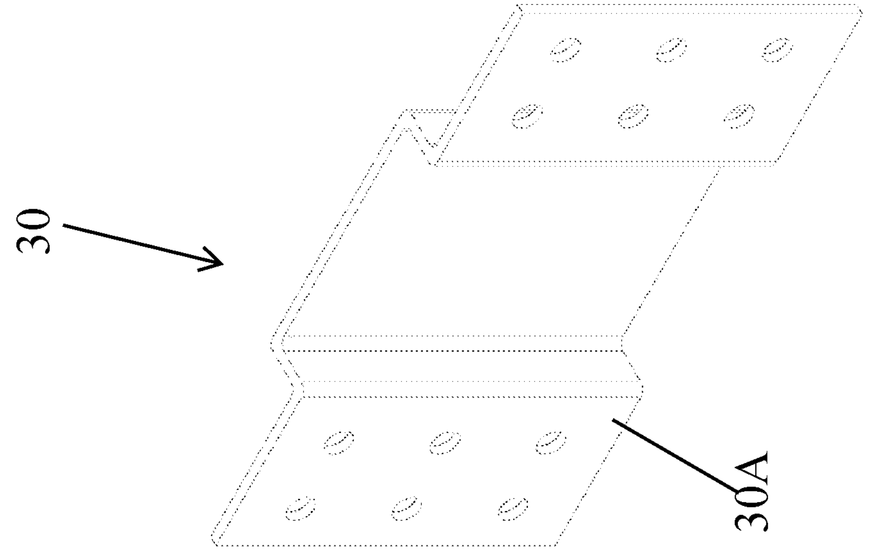
FIG. 8 illustrates a rear perspective view of a mounting bracket used in the electric vehicle chassis structure of FIG. 1.
Figure 7:
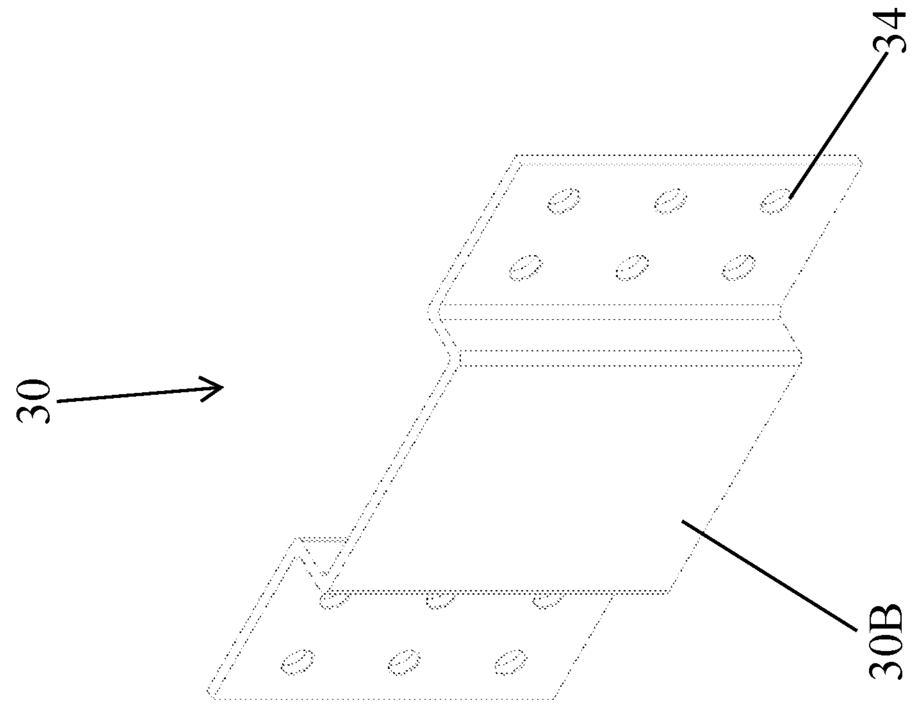
FIG. 7 illustrates front perspective view of a mounting bracket used in the electric vehicle chassis structure of FIG. 1.

Referring to FIGS. 7 and 8, a mounting bracket 30 can include aa mounting side 30A that is disposed against and attached to one of the chassis rails 12, 14. Mounting bracket attachment holes 34 can align with holes formed in the chassis rails 12, 14 and a mounting bolt 32 can form the attachment there between. An angle bracket attachment surface 30B, opposite the mounting side 30A, can provide a flat surface for attachment of an angle bracket 36, described below. The angle bracket 36 can connect to the mounting bracket 30 in various manners, such as with bolts, by welding, by being integrally formed, or the like.

Figure 9:
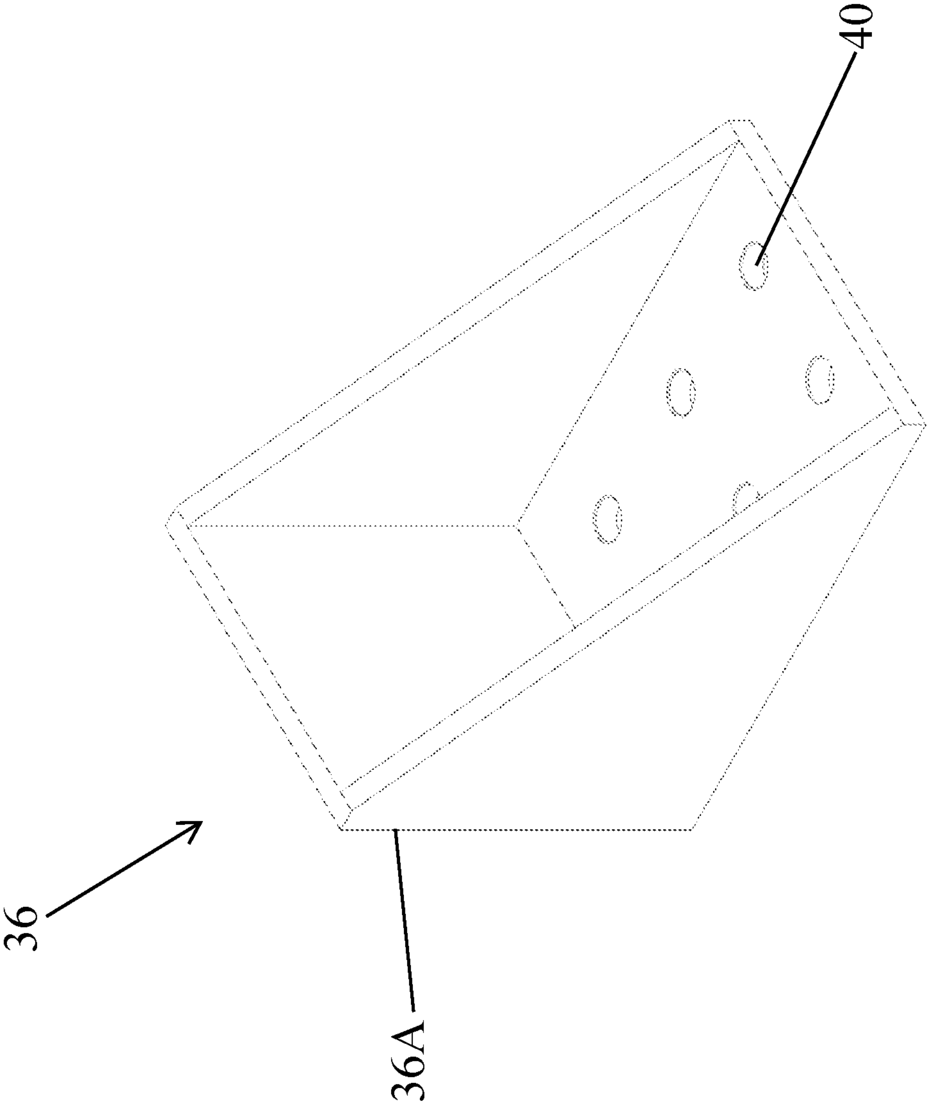
FIG. 9 illustrates a perspective view of an angle bracket used in the electric vehicle chassis structure of FIG. 1.
Figure 10A:
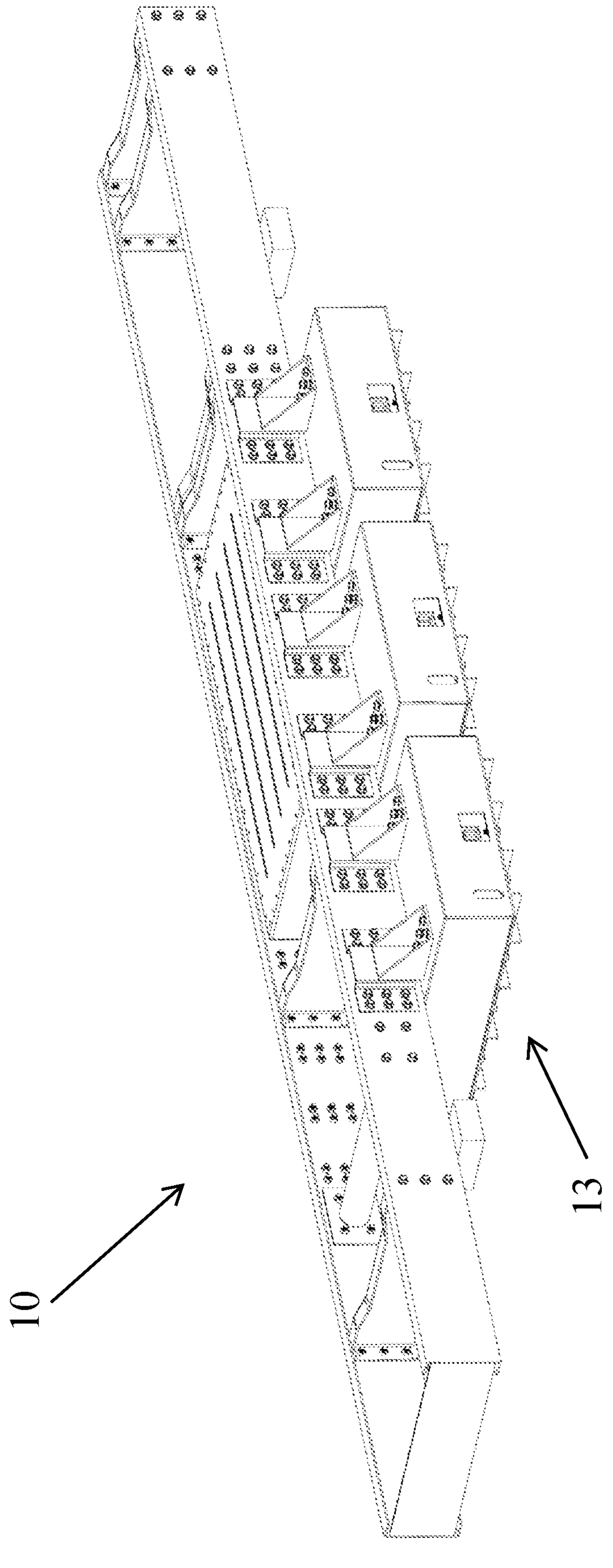
FIG. 10A illustrates a perspective view of the vehicle chassis structure of FIG. 1, at a start of a battery swap process, according to an exemplary embodiment of the present invention.
Figure 10B:
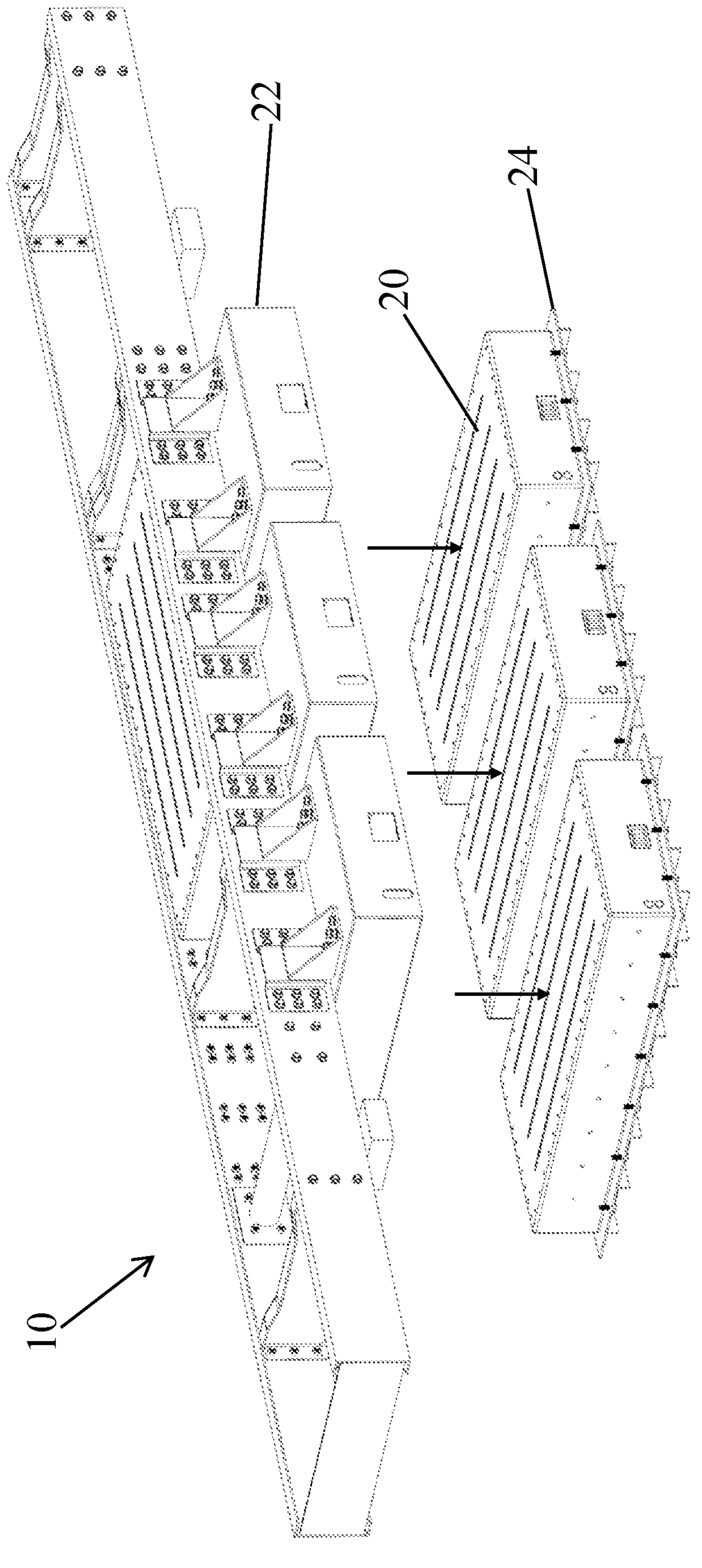
FIG. 10B illustrates a perspective view showing a tray and battery of three battery protective cases being lowered.
Figure 10C:
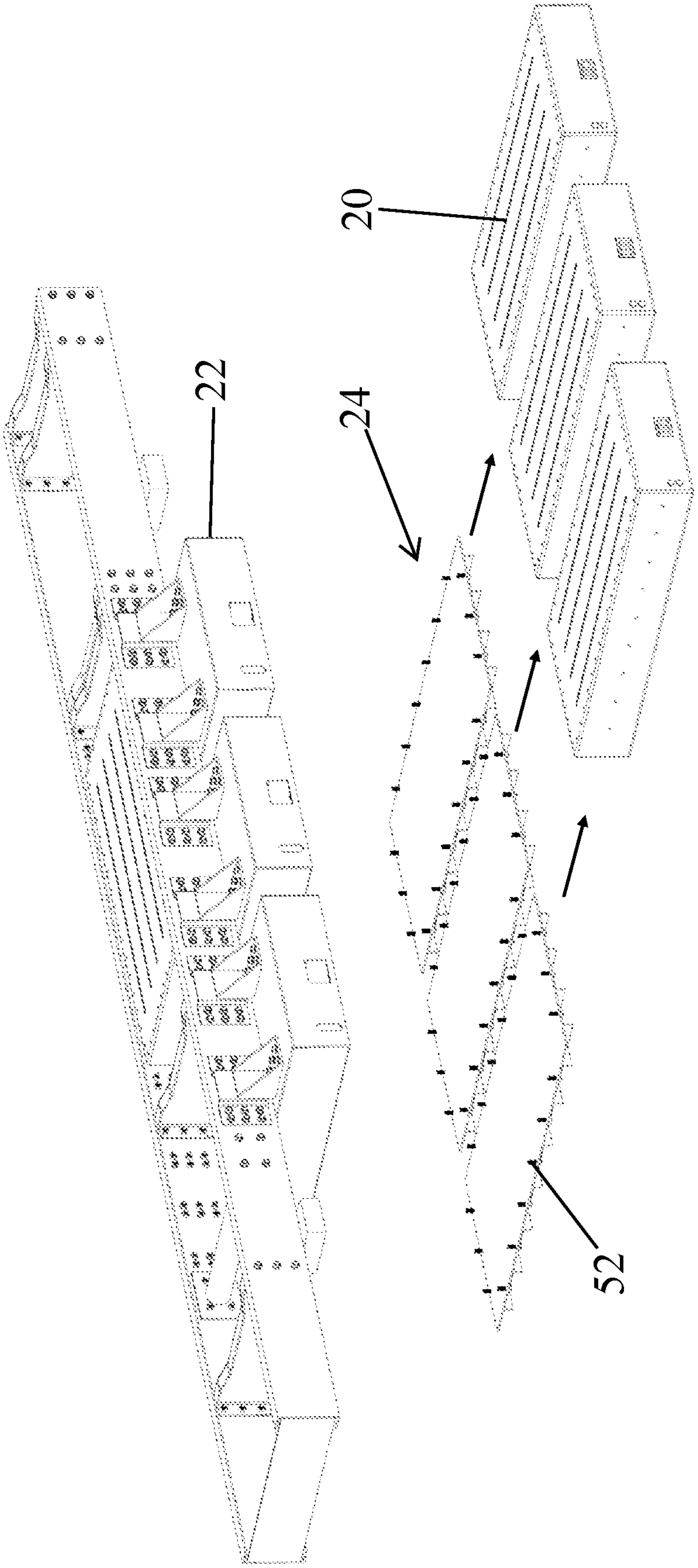
FIG. 10C illustrates a perspective view showing batteries being removed from their respective trays.
Figure 10D:
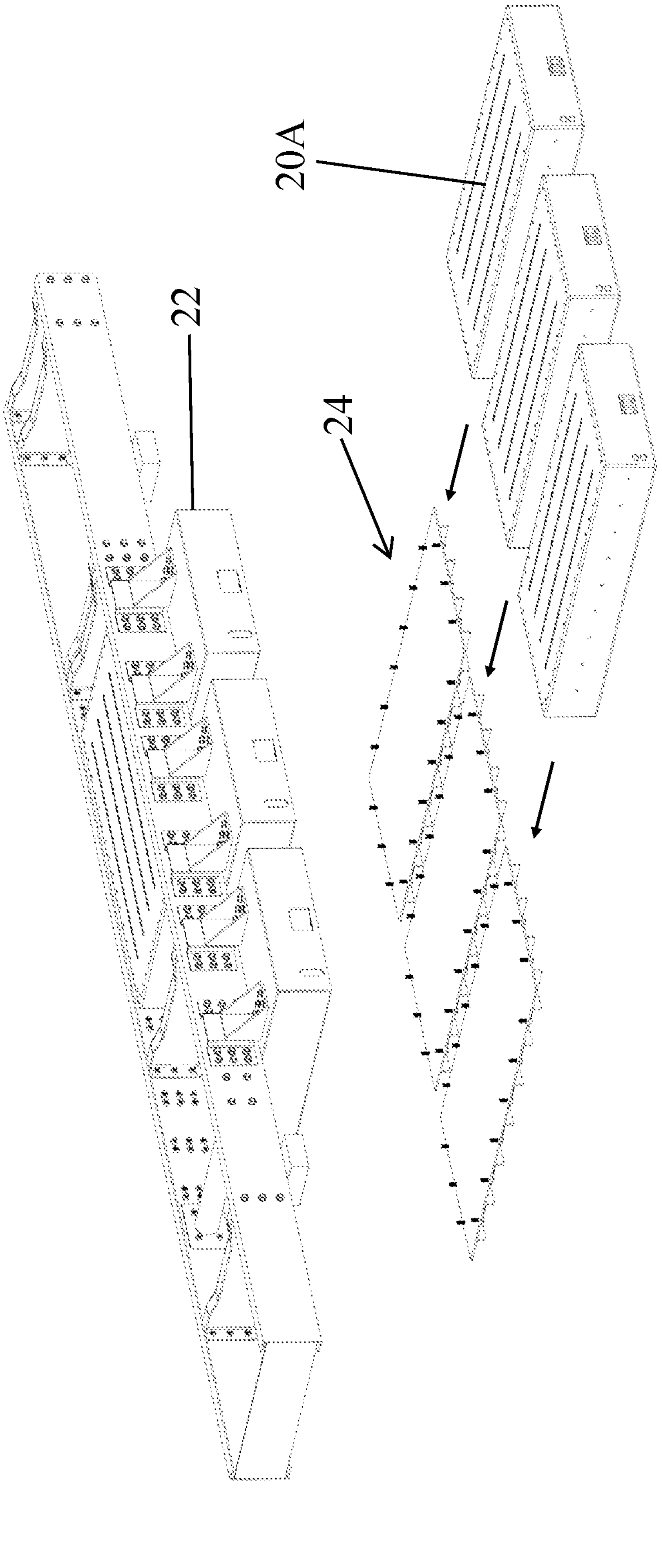
FIG. 10D illustrates a perspective view showing new batteries being replaced into their respective trays.
Figure 10E:
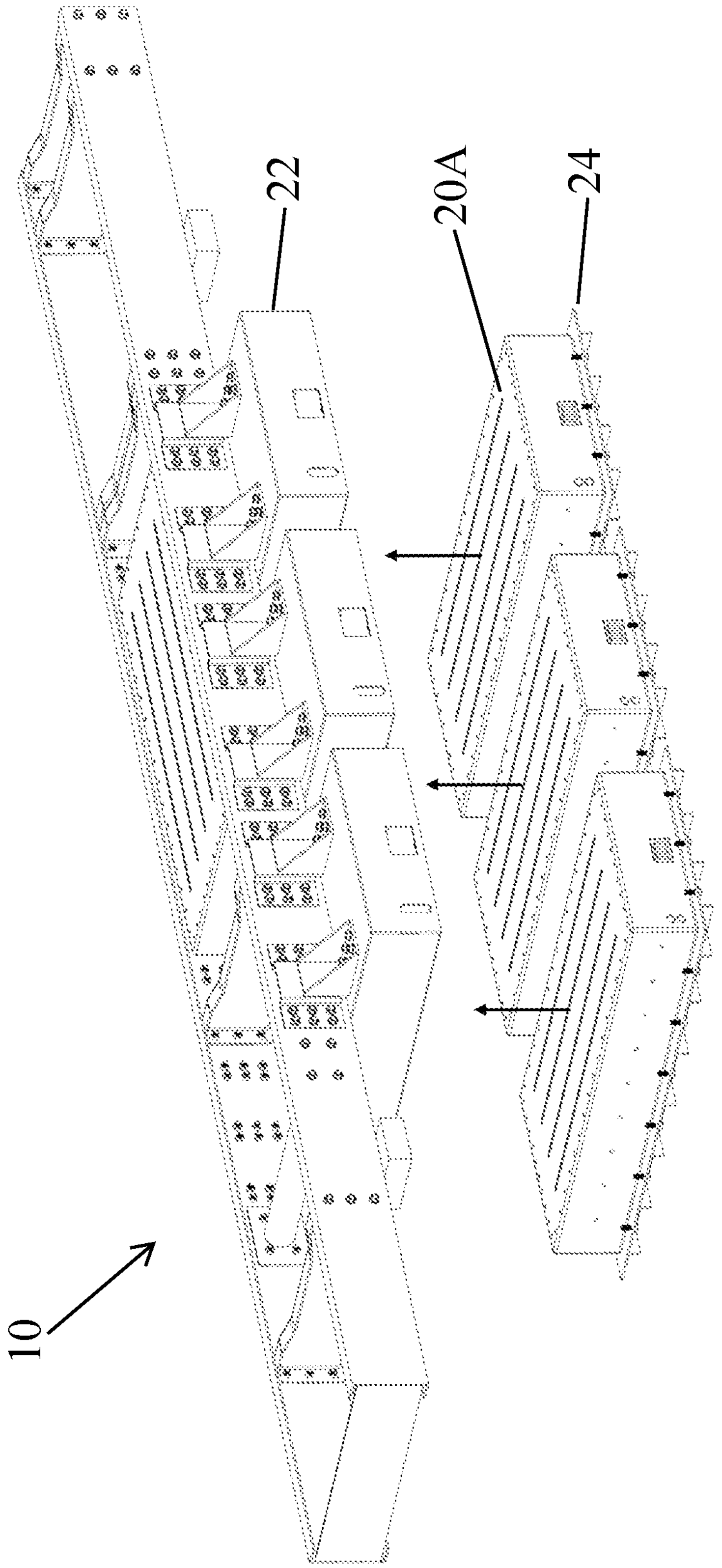
FIG. 10E illustrates a perspective view showing the trays and batteries being moved into position within their respective protective cases.
Figure 10F:
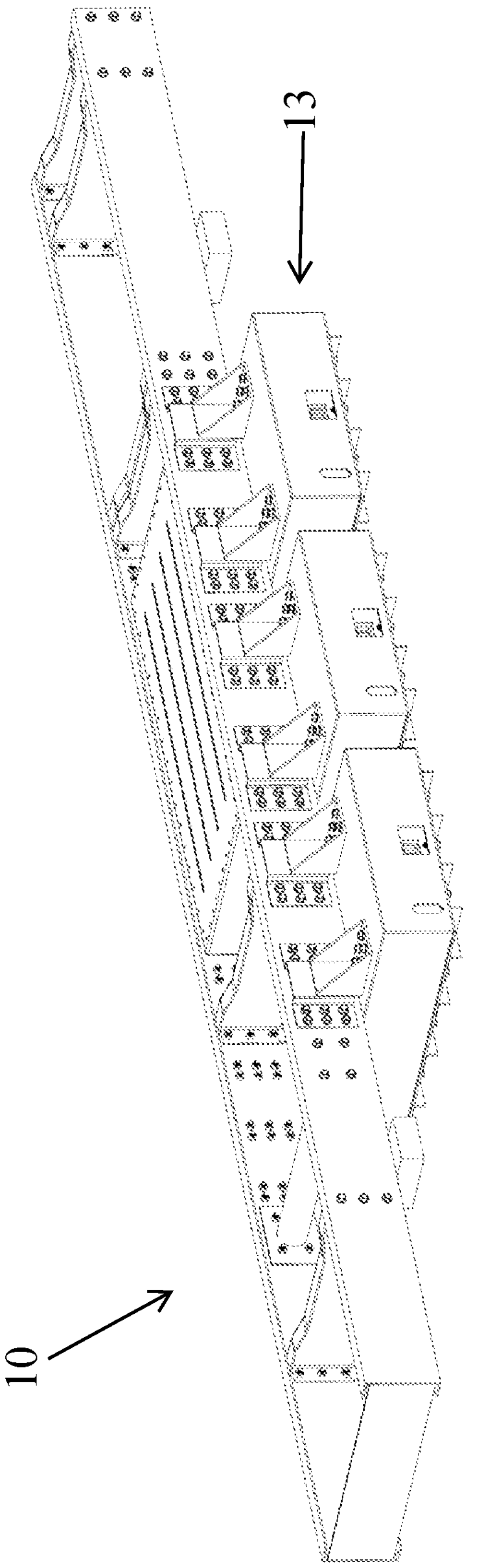
FIG. 10F illustrates a perspective view of the vehicle chassis structure and battery compartments, having the newly replaced battery packs therein.

Referring to FIG. 9, the angle bracket 36 can include a mounting bracket attachment surface 36A that can attach to the angle bracket attachment surface 30B. The mounting bracket attachment surface 36A can form one side of an exterior L-shape, where the other side of the exterior L-shape can include a plurality of angle bracket mounting holes 40 can align with the protective case mounting holes 54 (see FIG. 5) and a bolt 38 (see FIG. 1) can pass through the aligned holes 54, 40 to secure the protective case 22 to the angle bracket 36.

Referring to FIGS. 10A through 10F, a process for swapping the lower battery packs 20 with new lower battery packs 20A is illustrated. In the transition from FIG. 10A to FIG. 10B, the fasteners 52 are removed and the tray 24 is lowered. As can be seen, the lower battery packs 20 may be lowered along with the tray 24. In the transition from FIG. 10B to FIG. 10C, the lower battery packs 20 may be removed from the tray base 26 of the tray 24. In the transition from FIG. 10C to FIG. 10D, New battery packs 20A may be obtained to replace the lower battery packs 20 and, in FIG. 10E, the new battery packs 20A are placed on the respective trays 24 and, in FIG. 10F, the trays 24 are reattached to the protective cases 22. The swapping of batteries can be performed quickly and easily, without the need to remove additional components to gain access thereto.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A chassis structure for an electric vehicle comprising:

a main chassis frame extending along a longitudinal axis of the electric vehicle;

a plurality of lower battery compartments, each attached to the main chassis frame; and a removable tray of each of the plurality of lower battery compartments, the removable tray permitting removal of a battery from within respective ones of the plurality of lower battery compartments, wherein:

the plurality of lower battery compartments are disposed entirely below rails of the main chassis frame;

the plurality of lower battery compartments each include a protective case disposed entirely below the rails of the main chassis frame; and the protective case forms an uppermost top surface of an interior of the lower battery compartment.

2. The chassis structure of claim 1, wherein the plurality of lower battery compartments include three battery compartments.

3. The chassis structure of claim 1, further comprising an upper battery compartment housing an upper battery between the rails of the main chassis frame.

4. The chassis structure of claim 3, wherein:

the upper battery is disposed in a direction parallel with the longitudinal axis of the electric vehicle; and the lower battery compartments are oriented in a direction orthogonal to the longitudinal axis of the electric vehicle.

5. The chassis structure of claim 1, wherein the lower battery compartments are oriented in a direction with a longer side of the plurality of lower battery compartments orthogonal to the longitudinal axis of the electric vehicle.

6. The chassis structure of claim 1, further comprising a tray base of the removable tray covering an open bottom end of each tray protective.

7. The chassis structure of claim 6, further comprising a support structure attached to a lower side of the tray base of the tray, the support structure operable to support the battery thereupon.

8. The chassis structure of claim 1, wherein each protective case includes one or more view windows permitting a user to access the battery disposed within the protective case.

9. The chassis structure of claim 1, further comprising an angle brackets attached directly to an upper side of the protective case, the angle brackets each providing an attachment to a side of an exterior surface of the rails of the main chassis frame.

10. The chassis structure of claim 9, further comprising mounting brackets attached to the exterior surface of the rails of the main chassis frame, the mounting brackets each having a mounting bracket attachment surface configured to be affixed to an angle bracket mounting surface of respective ones of the angle brackets.

11. The chassis structure of claim 10, wherein the angle bracket attachment surface is orthogonal with a top surface of the protective case.

12. The chassis structure of claim 11, wherein each protective case is attached with a first set of two of the angle brackets on a first side thereof and with a second set of two of the angle brackets on a second side thereof, the first set attached with a first one of the rails of the main chassis frame and the second set attached to a second one of the rails of the main chassis frame.

13. A chassis structure for an electric vehicle comprising:

a main chassis frame extending along a longitudinal axis of the electric vehicle;

a plurality of lower battery compartments, each attached to the main chassis frame, wherein the plurality of lower battery compartments are disposed entirely below rails of the main chassis frame;

a removable tray of each of the plurality of lower battery compartments, the removable tray permitting removal of a battery from within respective ones of the plurality of lower battery compartments;

wherein the plurality of lower battery compartments each include:

a protective case disposed entirely below the main chassis frame;

a tray base of the removable tray covering an open bottom end of each protective case; and a support structure attached to a lower side of the tray base of the tray, the support structure operable to support the battery thereupon; and angle brackets attached directly to an upper side of the protective case, the angle brackets providing an attachment to a side of an exterior surface of the rails of the main chassis frame, wherein the protective case forms an uppermost top surface of an interior of the lower battery compartment.

14. The chassis structure of claim 13, further comprising mounting brackets attached to the exterior surface of the rails of the main chassis frame, the mounting brackets each having a mounting bracket attachment surface configured to be affixed to an angle bracket mounting surface of respective ones of the angle brackets.

15. The chassis structure of claim 13, wherein the angle bracket attachment surface is orthogonal with a top surface of the protective case.

16. The chassis structure of claim 13, further comprising an upper battery compartment housing an upper battery between the rails of the main chassis frame, wherein:

the upper battery is disposed in a direction parallel with the longitudinal axis of the electric vehicle; and the lower battery compartments are oriented in a direction orthogonal to the longitudinal axis of the electric vehicle.

17. The chassis structure of claim 13, wherein each protective case includes one or more view windows permitting a user to access the battery disposed within the protective case.

18. A chassis structure for an electric vehicle comprising:

a main chassis frame extending along a longitudinal axis of the electric vehicle;

a plurality of lower battery compartments, each attached to the main chassis frame, wherein the plurality of lower battery compartments are disposed entirely below rails of the main chassis frame;

a removable tray of each of the plurality of lower battery compartments, the removable tray permitting removal of a battery from within respective ones of the plurality of lower battery compartments;

wherein the plurality of lower battery compartments each include:

a protective case disposed entirely below the main chassis frame;

a tray base of the removable tray covering an open bottom end of each protective case; and a support structure attached to a lower side of the tray base of the tray, the support structure operable to support the battery thereupon;

angle brackets attached directly to an upper side of the protective case, the angle brackets providing an attachment to a side of an exterior surface of rails of the main chassis frame; and mounting brackets each attached to the exterior surface of the rails of the main chassis frame, the mounting brackets each having a mounting bracket attachment surface configured to be affixed to an angle bracket mounting surface of respective ones of the angle brackets, wherein:

the angle bracket attachment surface is orthogonal with a top surface of the protective case; and the protective case forms an uppermost top surface of an interior of the lower battery compartment.

19. The chassis structure of claim 18, wherein each protective case includes one or more view windows permitting a user to access the battery disposed within the protective case.

* * * * *